US005841111A

United States Patent [19]

Shea et al.

[11] Patent Number: 5,841,111

[45] Date of Patent: Nov. 24, 1998

[54] LOW RESISTANCE ELECTRICAL INTERFACE FOR CURRENT LIMITING POLYMERS BY PLASMA PROCESSING

[75] Inventors: John Joseph Shea; William Kingston Hanna, both of Pittsburgh, Pa.

[73] Assignee: Eaton Corporation, Cleveland, Ohio

[21] Appl. No.: 770,746

[22] Filed: Dec. 19, 1996

[51] Int. Cl.[6] .......... B23K 10/00

[52] U.S. Cl. .......... 219/504; 219/505; 219/541; 219/543; 219/548; 219/121.59; 219/121.41; 29/611; 29/621

[58] Field of Search .......... 219/504, 505, 219/541, 543, 548, 549, 212, 510, 121.4, 121.41, 121.43, 121.59; 257/467; 338/225 D, 22 R; 29/613, 611, 621

[56] References Cited

U.S. PATENT DOCUMENTS

| | | | |
|---|---|---|---|
| 3,351,882 | 11/1967 | Kohler et al. | 338/322 |
| 3,835,434 | 9/1974 | Kahn | 338/22 |
| 4,238,812 | 12/1980 | Middleman et al. | 361/106 |
| 4,272,471 | 6/1981 | Walker | 264/104 |
| 4,304,987 | 12/1981 | van Konynenburg | 219/553 |
| 4,314,230 | 2/1982 | Cardinal et al. | 338/314 |
| 4,314,231 | 2/1982 | Walty | 338/328 |
| 4,315,237 | 2/1982 | Middleman et al. | 338/22 R |
| 4,317,027 | 2/1982 | Middleman et al. | 219/553 |
| 4,330,703 | 5/1982 | Horsma et al. | 219/553 |
| 4,426,633 | 1/1984 | Taylor | 338/25 |
| 4,475,138 | 10/1984 | Middleman et al. | 361/58 |
| 4,545,926 | 10/1985 | Fouts, Jr. et al. | 252/511 |
| 4,647,894 | 3/1987 | Ratell | 338/22 R |
| 4,685,025 | 8/1987 | Carlomagno | 361/106 |
| 4,689,475 | 8/1987 | Kleiner et al. | 219/553 |
| 4,724,417 | 2/1988 | Au et al. | 338/22 R |
| 4,774,024 | 9/1988 | Deep et al. | 252/511 |
| 4,775,778 | 10/1988 | van Konynenburg et al. | 219/549 |
| 4,780,598 | 10/1988 | Fahey et al. | 219/511 |
| 4,800,253 | 1/1989 | Kleiner et al. | 219/553 |
| 4,845,838 | 7/1989 | Jacobs et al. | 29/671 |
| 4,907,340 | 3/1990 | Fang et al. | 29/610.1 |
| 4,910,389 | 3/1990 | Sherman et al. | 219/548 |
| 4,924,074 | 5/1990 | Fang et al. | 219/548 |
| 5,049,850 | 9/1991 | Evans | 338/22 R |
| 5,195,013 | 3/1993 | Jacobs et al. | 361/106 |
| 5,281,845 | 1/1994 | Wang et al. | 257/467 |
| 5,436,609 | 7/1995 | Chan et al. | 338/22 R |
| 5,602,520 | 2/1997 | Baiatu et al. | 338/22 R |

OTHER PUBLICATIONS

J. A Greenwood, *Constriction Resistance and the Real Area of Contact*, British Journal of Applied Physics, 1966.

ABB Control: Product Brochure and name plate *Installation and Maintenance of Current Limiter Type PROLIM*, Oct. 23, 1992.

Chappell et al. *Surface Modification of Extended Chain Polyethylene Fibres to Improve Adhesion to Epoxy and Unsaturated Polyester Resins*, 1990.

Garenser, et al., *E.s.c.a. studies of corona–discharge–treated polyethylene surfaces by use of gas–phase derivatization*, Polymer, vol. 26 No. 8 Aug. 1985, pp. 1162–1166.

*Constriction Resistance and the Real Area of Contact*, British Journal of Applied Physics pp. 1621–1632, (1966).

*Primary Examiner*—Mark H. Paschall
*Attorney, Agent, or Firm*—Martin J. Moran

[57] ABSTRACT

A novel current limiting PTC polymer device comprising a conductive polymer composition with electrodes attached thereto characterized by having a low contact resistance and a method of producing the same. The invention provides for the selective treatment of portions of the surface of the conductive polymer composition by at least one of plasma/corona etching and plasma sputtering/plasma spray to create a site for attachment of the electrodes resulting in a low contact resistance. The electrical devices of the invention are particularly useful in circuit protection applications.

7 Claims, 3 Drawing Sheets

LOW RESISTANCE ELECTRICAL INTERFACE FOR CURRENT LIMITING POLYMERS BY PLASMA PROCESSING

FIELD OF THE INVENTION

This invention relates to electrical devices based on current limiting PTC polymer devices, and in particular to electrical circuit protection devices comprising a current limiting PTC polymer device composed of a conductive polymer composition in combination with suitable electrodes. The invention also concerns the physical and electrical interface between the conductive polymer composition and the electrodes combined thereto. Specifically, the invention concerns an interface between a conductive polymer composition and an electrode resulting in a low contact resistance.

BACKGROUND OF THE INVENTION

Current limiting polymer compositions which exhibit positive temperature coefficient of resistance (PTC) behavior, and electrical devices comprising current limiting polymer compositions have been widely used. The current limiting polymer compositions generally include conductive particles, such as carbon black, graphite or metal particles, dispersed in a polymer matrix, such as thermoplastic polymer, elastomeric polymer or thermosetting polymer. PTC behavior in a current limiting polymer composition is characterized by the material undergoing a sharp increase in resistivity as its temperature rises above a particular value otherwise known as the anomaly or switching temperature, $T_s$. Materials exhibiting PTC behavior are useful in a number of applications including electrical circuit protection devices in which the current passing through a circuit is controlled by the temperature of a PTC element forming part of that circuit.

Particularly useful devices comprising current limiting polymer compositions are electrical circuit protection devices. Such circuit protection devices usually contain a current limiting polymer device comprised of two electrodes embedded in a current limiting polymer composition. When connected to a circuit, the circuit protection devices have a relatively low resistance under normal operating conditions of the circuit, but are tripped, that is, converted into a high resistance state when a fault condition, for example, excessive current or temperature, occurs. When the circuit protection device is tripped by excessive current, the current passing through the PTC device causes it to self-heat to its transition temperature or switching temperature, $T_s$, at which a rapid increase in its resistance takes place, to transform it to a high resistance state.

Representative electrical circuit protection devices and current limiting polymer compositions for use in such devices are described, for example, in U.S. Pat. Nos. 4,545,926 (Fouts, Jr., et al.); 4,647,894 (Ratell); 4,685,025 (Carlomagno); 4,724,417 (Au, et al.); 4,774,024 (Deep, et al.); 4,775,778 (van Konynenburg, et al.); 4,857,880 (Au, et al.); 4,910,389 (Sherman, et al.); 5,049,850 (Evans); and 5,195,013 (Jacobs, et al.).

In such devices a current limiting polymer composition is attached in some manner to a source of electrical power. This is generally provided by what is referred to in the art as an electrode which is in contact with the current limiting polymer composition and which is connected to a source of electrical power. The interface in these devices between the current limiting polymer composition and the metal electrode presents certain problems which limit the range of applications in which such devices can be reliably implemented commercially. For example, the avoidance of excessive current concentrations at any spot near the electrodes of the device presents problems, as does the provision of electrodes in a form which will reliably distribute the current over a suitable cross-sectional area of the current limiting polymer composition of the device and without variations of such distribution on repeated cycles of operation of the device. Furthermore, the use of metal electrodes may lead to some degree of electrical non-uniformity; if the surface of the electrode closest to the other electrode has any imperfections, this can lead to electrical stress concentration which will cause poor performance. This problem is particularly serious when the current limiting polymer composition exhibits PTC behavior, since it can cause creation of a hot zone adjacent to the electrode; it also becomes increasingly serious as the distance between the electrodes gets smaller.

Current limiting polymer compositions have found commercial application in circuit protection devices for telecommunications lines and for surge protection in small motors. Such devices, however, have been limited to use in systems with relatively low currents and voltages. These devices have been so limited due, in part, to the level of contact resistance associated with the interface between the current limiting polymer composition and the electrodes. It has been determined that the contact resistance in these devices can contribute up to 75% of the total device resistance. Accordingly, it would be desirable to have an interface between the current limiting polymer composition and the electrodes that results in a low contact resistance for the device.

The electrodes which have been used in such current limiting PTC polymer devices include solid and stranded wires, wire rovings, metal foils, expanded metal, perforated metal sheets, etc. A variety of methods have been developed for connecting the electrodes to the current limiting polymer composition. For example, U.S. Pat. Nos. 3,351,882 (Kohler, et al.); 4,272,471 (Walker); 4,426,633 (Taylor); 4,314,231 (Walty); 4,689,475 (Kleiner, et al. '475); 4,800,253 (Kleiner, et al. '253); and 4,924,074 (Fang, et al.).

Specifically, Walty describes a method for attaching planer electrodes to current limiting polymer compositions using an electrically conductive adhesive. Taylor discloses a method for laminating metal foil electrodes to the current limiting polymer composition through the use of pressure, heat and time. Taylor also discloses the optional use of an electrically conductive adhesive to help bind the electrode to the current limiting polymer composition. Finally, Kleiner, et al. '253 & '475 disclose the use of electrodes with microrough surfaces. Namely, Kleiner, et al., teaches the use of electrodes that have a roughened surface obtained by removal of material from the surface of a smooth electrode, e.g. by etching; by chemical reaction on the surface of a smooth electrode, e.g. by galvanic deposition; or by deposition of a microrough layer of the same or a different material on the surface of the electrode.

In order to obtain room temperature resistance levels in the 0.1–5 mΩ range, low bulk resistivity and low contact resistance are necessary. Current limiting polymer composition based electrical devices having a voltage rating of 500 $V_{rms}$ and a current rating of 63 $A_{rms}$ steady state for reducing let-through values in molded case circuit breakers are available. To achieve these high voltage and current ratings, however, the currently available devices require a large area parallel plate geometry with high spring pressure to connect the electrodes to the current limiting polymer composition.

The high spring pressure connecting the electrodes to the current limiting polymer composition helps to reduce the contact resistance. As the pressure increases the area of real contact between the electrode and the current limiting polymer composition increases. Also the area of contact by the electrode with the conductive filler increases with increasing pressure. At these elevated pressures, the current limiting polymer composition plastically deforms to make intimate contact with the electrodes. A thin layer of polymer may cover a large percentage of the contact area between the electrodes and the current limiting polymer composition. This thin layer of polymer will prevent direct contact between the conductive filler particles in the current limiting polymer composition and the electrodes. This factor limits the decrease in device resistance obtainable through the application of pressure to connect electrodes to the current limiting polymer composition. Furthermore, the resulting device requires a large package and consequently has to be mounted externally to the circuit breaker. Therefore, it would be desirable to have a method for attaching electrodes to current limiting polymer compositions which would provide for a compact geometry and which would not require high spring pressure.

What is needed are current limiting PTC polymer devices which have a low contact resistance capable of use in high current/high voltage applications. Particularly what is needed is a method for attaching electrodes to a current limiting polymer composition and for preparing the current limiting polymer composition for such attachment which results in a low resistance electrical interface relative to the overall device resistance. A low contact resistance relative to the overall device resistance is desirable for two main reasons. First, the joule heating will occur in the bulk of the current limiting polymer composition thus preventing arcing at the electrode-composition interface. Such arcing results in electrode delamination or a thermal/electrical break down in the electrode composition interface. Second, the lower the overall device resistance the higher the steady state current ratings obtainable for the device.

SUMMARY OF THE INVENTION

We have now discovered a way to interface metal electrodes with a current limiting polymer composition such that a low contact resistance results. Specifically, it has now been discovered that selective surfaces of the current limiting polymer composition can be treated by plasma etching to increase the concentration at the treated surface of the conductive particles dispersed within the current limiting polymer composition. It has been further discovered that metals can be sputter deposited onto selected surfaces of the current limiting polymer composition following plasma etching or in the absence of plasma etching.

The electrical devices of the invention have the following advantageous characteristics:

- an increase in the area of contact between the conductive particles at the surface of the polymer composition and the bulk metal electrode attached thereto to facilitate incorporation of the electrical device into a given circuit;
- a reduction in the contact resistance of the electrical devices of the invention allowing for increased steady state current/voltage ratings;
- a reduction in required device size allowing for smaller more form fitting devices;
- no need for spring loaded systems to impart pressure at the interface between the current limiting polymer composition and the bulk electrode;
- economical device construction; and,
- increased device life facilitated by chemical bonding at the interface between the current limiting polymer composition and the bulk electrode.

It is an object of the invention to provide an electrical device based on a current limiting polymer composition with metal electrodes attached thereto in a manner that results in a low contact resistance.

It is another object of the invention to provide an electrical device wherein at least two surfaces of the current limiting polymer composition are enriched with conductive particles.

It is another object of the invention to provide an electrical device wherein at least two surfaces of the current limiting polymer composition are metallized by plasma sputtering.

It is another object of the invention to provide a method for treating at least two surfaces of a current limiting polymer composition by plasma etching to remove molecules of the polymer from said surfaces, leaving said surfaces enriched with exposed conductive particles.

It is yet another object of the invention to provide a method for metallizing at least two surfaces of a current limiting polymer composition by plasma sputtering such that metal electrodes may be attached to the current limiting polymer composition by soldering or welding the metal electrodes to the metallized surfaces of said composition or by mechanical means of spring pressure methods.

One aspect of the invention resides in current limiting PTC polymer devices which comprise: (a) a conductive polymer composition comprising a polymer with conductive particles dispersed therein, wherein at least two surfaces of said conductive polymer composition are enriched with said conductive particles, and (b) at least two electrodes attached to said conductive polymer composition at said at least two surfaces enriched with conductive particles. In this current limiting PTC polymer device, the conductive polymer composition can include thermoplastic polymer, elastomeric polymer or thermosetting polymer. In this current limiting PTC polymer device, the conductive filler particles incorporated into the conductive polymer composition can include carbon black, graphite, metal powders, metal salts and conductive metal oxides. This conductive polymer composition can also include non-conductive fillers such as flame retardants, arc-suppression agents, radiation cross-linking agents, plasticizers, antioxidants, and other adjuvants. These conductive polymer compositions can further be cross-linked by radiation, chemical cross-linking, or heat cross-linking for improved electrical properties.

Another aspect of the invention resides in current limiting PTC polymer devices which comprise: (a) a conductive polymer composition comprising a polymer with conductive particles dispersed therein, wherein at least two surfaces of said conductive polymer composition are metallized, and (b) at least two electrodes attached to said conductive polymer composition at said at least two metallized surfaces. In this current limiting PTC polymer device, the conductive polymer composition can include thermoplastic polymer, elastomeric polymer or thermosetting polymer. The conductive filler particles can include carbon black, graphite, metal powders, metal salts, conductive metal oxides and mixtures thereof. The material used to metallize the at least two metallized surfaces of the conductive polymer composition include tantalum, tungsten, titanium, chromium, molybdenum, vanadium, zirconium, aluminum, silver, copper, nickel, gold, brass, zinc, mixtures thereof and plated metals, i.e. silver plated copper. This conductive polymer composition can also include non-conductive fillers such as flame retardants, arc-suppression agents, radiation cross-linking agents, plasticizers, antioxidants, and other adjuvants. These conductive polymer compositions can further be cross-linked by radiation, chemical cross-linking, or heat cross-linking for improved electrical properties.

Another aspect of the invention resides in a method of making current limiting PTC polymer devices which comprise: (a) a conductive polymer composition comprising a polymer with conductive particles dispersed therein, wherein at least two surfaces of the conductive polymer composition are enriched with conductive particles, and (b) at least two electrodes attached to said conductive polymer composition at said at least two surfaces enriched with conductive particles.

Another aspect of the invention resides in a method for making current limiting PTC polymer devices which comprise: (a) a conductive polymer composition comprising a polymer with conductive particles dispersed therein, wherein at least two surfaces of the conductive polymer composition are metallized, and (b) at least two electrodes attached to said conductive polymer composition at said at least two metallized surfaces.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the spirit and scope of the appended claims. In the drawings.

DETAILED DESCRIPTION OF THE PREFERRED EMBODIMENTS OF THE INVENTION

Figure 1:
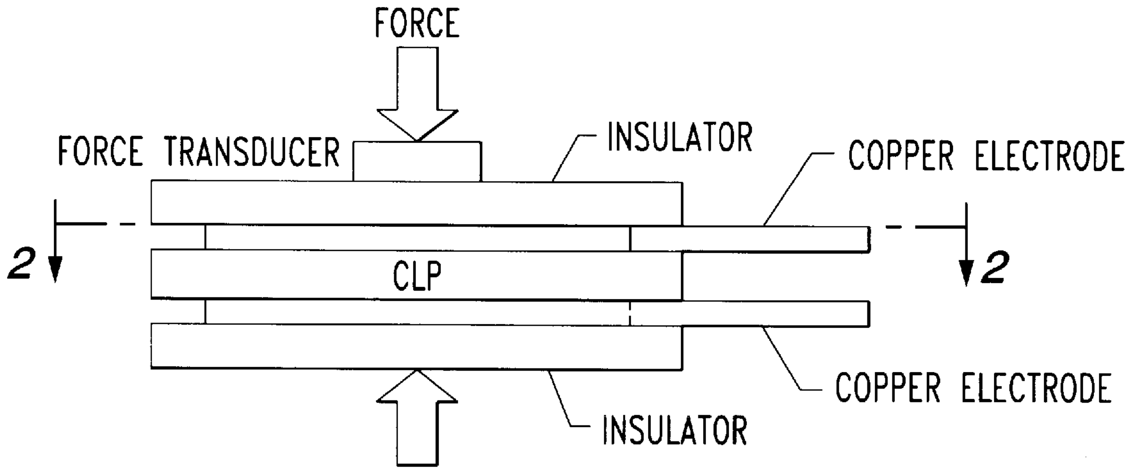
FIG. 1 is a depiction of a side elevational view of the parallel plate electrode attachment and four point probe used to measure the device resistance.

The novel current limiting PTC polymer devices of the invention are characterized by having a low contact resistance. One aspect of the invention provides an electrical device which comprises (a) a conductive polymer composition comprising a polymer with conductive particles dispersed therein, wherein at least two surfaces of said conductive polymer composition are enriched with said conductive particles, and (b) at least two electrodes attached to said conductive polymer composition at said at least two surfaces enriched with conductive particles. Such devices are characterized by being relatively conductive when used as a circuit component carrying normal current but which exhibit a very sharp increase in resistivity and reversibly transform into being relatively non-conductive when the temperature of the device increases above a switching temperature or switching temperature range, $T_S$, due to resistive Joule heating ($I^2R$) generated from a fault current. The electrical devices of the invention are particularly useful as PTC elements in electrical circuit protection devices.

The conductive polymer compositions of the invention can be surface treated to provide at least two conductive particle enriched surfaces. Such surface treatment entails plasma etching of the surfaces of the conductive polymer compositions to be enriched. Various plasma etching processes are known. Of the various known etching processes, corona etching may be particularly useful with the invention. Corona etching in air at atmospheric pressure may be as effective as etching at reduced pressures while being more cost effective and easier to implement on a manufacturing scale compared to conventional plasma etching processes.

For the purposes of this invention, plasma etching involves the selective removal of polymer molecules from the treated surfaces of the conductive polymer composition using plasma processing. Basically, plasma etching entails ion bombardment as well as chemical reactions of the surface of the conductive polymer composition with mobile ions. Because the polymer molecules are more readily energized by the ion bombardment, the plasma etching results in a greater loss of polymer molecules from the surface of the conductive polymer composition compared to the loss of atoms or molecules of the conductive particles. Accordingly, the plasma etched surface of the conductive polymer composition has a higher concentration of conductive particles exposed (i.e., no polymer film covering the surface of the particles on the treated surface of the conductive polymer composition) than do the untreated surfaces. Hence, selective treatment of a surface of the conductive polymer composition leaves said surface enriched with conductive particles, i.e., carbon black. Because the conductive particles are more conductive than the polymer, the increase in the concentration of conductive particles at the surface of the conductive polymer composition results in a significant decrease in the contact resistance between said treated surface and the electrode subsequently attached thereto. Furthermore, generally speaking, the greater the area of real contact between the conductive particles and the electrode the lower the contact resistance. The treatment of the surface of the conductive polymer composition results in an increase in the area of real contact between said composition and the electrode subsequently attached thereto, and hence, reduces the contact resistance. Thus, plasma etching of the conductive polymer composition results in a two fold decrease in the contact resistance of the current limiting PTC polymer devices of the invention.

Selected areas on the surface of the conductive polymer compositions may also optionally be metallized. Particularly, when the conductive particles dispersed within the polymer comprise carbon black, the most preferred conductive particle filler for use with the invention, the metals used to metallize the conductive polymer composition may be capable of reacting with the conductive carbon particles to form a carbide; preferably the metal should be selected from the group comprising tantalum, tungsten, titanium, chromium molybdenum, vanadium, zirconium, aluminum, silver, nickel and mixtures thereof; more preferably from a group of metals which exhibit both a low oxidation and the tendency to form highly conductive oxides, i.e., Ti, Cr or some form of hybrid which reacts to form a highly conductive oxide, i.e., $WTiC_2$. Alternatively, non-carbide forming metals may be used provided that they maintain long term (≧10 year) conductivity, i.e. silver, nickel, silver plating over copper, and silver plating over nickel, may be used with the invention.

The surface of the conductive polymer composition can be metallized using a deposition process known in the art as plasma sputtering. Alternatively, plasma spray techniques in air at atmospheric pressure may be used to metallize the surfaces of conductive polymer compositions on a manufacturing scale at reduced cost compared to conventional plasma sputtering processes. Basically, the plasma sputtering process entails bombarding a metal target, i.e., silver, with argon ions, or similar ions such that metal atoms are liberated from the surface of the target and impinge on the surface of the conductive polymer composition. Before being metallized, the selected surfaces of the conductive polymer composition can be optionally plasma etched by the process described above. In the event that the selected surfaces are plasma etched prior to metallization, it is preferable that the plasma etching and plasma sputtering processes be performed in the same apparatus. It is most preferable that the interior cavity of the apparatus not be exposed to atmospheric gases between the etching and sputtering processes. Such procedure is preferred because atmospheric gases may contaminate the sample surface.

The polymers suitable for use in preparing the conductive polymer compositions of the invention can be thermoplastic, elastomeric or thermosetting resins or blends thereof; preferably thermoplastic polymers; most preferably polyethylene polymers.

Thermoplastic polymers suitable for use in the invention, may be crystalline or non-crystalline. Illustrative examples are polyolefins, such as polyethylene or polypropylene, copolymers (including terpolymers, etc.) of olefins such as ethylene and propylene, with each other and with other monomers such as vinyl esters, acids or esters of α, β-unsaturated organic acids or mixtures thereof, halogenated vinyl or vinylidene polymers such as polyvinyl chloride, polyvinylidene chloride, polyvinyl fluoride, polyvinylidene fluoride and copolymers of these monomers with each other or with other unsaturated monomers, polyesters, such as poly(hexamethylene adipate or sebacate), poly(ethylene terephthalate) and poly(tetramethylene terephthalate), polyamides such as Nylon-6, Nylon-6,6 Nylon-6,10 and the "Versamids" (condensation products of dimerized and trimerized unsaturated fatty acids, in particular linoleic acid with polyamines), polystyrene, polyacrylonitrile, thermoplastic silicone resins, thermoplastic polyethers, thermoplastic modified celluloses, polysulphones and the like.

Suitable elastomeric resins include rubbers, elastomeric gums and thermoplastic elastomers. The term "elastomeric gum", refers to a polymer which is non-crystalline and which exhibits rubbery or elastomeric characteristics after being cross-linked. The term "thermoplastic elastomer" refers to a material which exhibits, in a certain temperature range, at least some elastomer properties; such materials generally contain thermoplastic and elastomeric moieties.

Suitable elastomeric gums for use in the invention include, for example, polyisoprene (both natural and synthetic), ethylene-propylene random copolymers, poly(isobutylene), styrene-butadiene random copolymer rubbers, styreneacrylonitrile-butadiene random copolymer rubbers, styreneacrylonitrile-butadiene terpolymer rubbers with and without added minor copolymerized amounts of α, β-unsaturated carboxylic acids, polyacrylate rubbers, polyurethane gums, random copolymers of vinylidene fluoride and, for example, hexafluoropropylene, polychloroprene, chlorinated polyethylene, chlorosulphonated polyethylene, polyethers, plasticized poly(vinyl chloride) containing more than 21% pasticizer, substantially non-crystalline random co- or ter-polymers of ethylene with vinyl esters or acids and esters of α, β-unsaturated acids. Silicone gums and base polymers, for example poly(dimethyl siloxane), poly(methylphenyl siloxane) and poly(dimethyl vinyl siloxanes) can also be use.

Thermoplastic elastomers suitable for use in the invention, include graft and block copolymers, such as random copolymers of ethylene and propylene grafted with polyethylene or polypropylene side chains, and block copolymers of α-olefins such as polyethylene or polypropylene with ethylene/propylene or ethylene-propylene/diene rubbers, polystyrene with polybutadiene, polystyrene with polyisoprene, polystyrene with ethylene-propylene rubber, poly(vinylcyclohexane) with ethylene-propylene rubber, poly(α-methylstyrene) with polysiloxanes, polycarbonates with polysiloxanes, poly(tetramethylene terephthalate) with poly(tetramethylene oxide) and thermoplastic polyurethane rubbers.

Thermosetting resins, particularly those which are liquid at room temperature and thus easily mixed with the conductive particles and particulate filler can also be used. Conductive compositions of thermosetting resins which are solids at room temperature can be readily prepared using solution techniques. Typical thermosetting resins include epoxy resins, such as resins made from epichchlorohydrin and bisphenol A or epichlorohydrin and aliphatic polyols, such as glycerol. Such resins are generally cured using amine or amide curing agents. Other thermosetting resins such as phenolic resins obtained by condensing a phenol with an aldehyde, e.g. phenol-formaldehyde resin, can also be used.

Conductive particles suitable for use in the invention can include, for example, conductive carbon black, graphite, carbon fibers, metal powders, e.g., nickel, tungsten, silver, iron, copper, etc., or alloy powders, e.g., nichrome, brass, conductive metal salts, and conductive metal oxides; with carbon black, graphite and carbon fibers being preferred; carbon black being most preferred. The conductive particles are distributed or dispersed in the polymer, to form conductive chains in the polymer under normal temperature conditions. The conductive particles are dispersed in the polymer preferably in the amount of 5 to 80% by weight, more preferably 10 to 60% by weight, and more preferably about 30 to 55% by weight, based on the weight of the total polymer. The conductive particles preferably have a particle size from about 0.01 to 200 microns, preferably from about 0.02 to 25 microns. The particles can be of any shape, such as flakes, rods, spheroids, etc., preferably spheroids. The amount of conductive particles incorporated into the polymer matrix will depend on the desired resistivity of the current limiting PTC polymer device. In general, greater amounts of conductive particles in the polymer will result in a lower resistivity for a particular polymeric material.

The conductive polymer compositions of the invention can further comprise non-conductive fillers including arc suppression agents, e.g., alumina trihydrate, radiation cross-linking agents, antioxidants, flame retardants, inorganic fillers, e.g. silica, plasticizers, and other adjuvants.

Furthermore, the conductive polymer compositions of the invention are preferably cured by cross-linking to impart the desired resistance-temperature characteristics to the current limiting PTC polymer device. The conductive polymer compositions of the invention can be cross-linked by radiation or by chemical cross-linking. For a description of radiation and/or chemical cross-linking methods known in the art, see, for example, U.S. Pat. Nos. 5,195,013 (Jacobs et al.); 4,907,340 (Fang et al.); 4,485,838 (Jacobs et al.); 4,775,778 (van Konynenburg et al.); and, 4,724,417 (Au et al.); the disclosures of which are incorporated herein by reference. Regardless of the cross-linking method used, however, the cross-links formed should be stable for operation in the temperature range in which the current limiting PTC polymer device is required to operate and also provide the element with the desired characteristics.

Prior to the optional etching and sputtering process treatments of the invention, the unsurface treated conductive polymer compositions of the invention may be prepared by conventional plastic processing techniques such as melt blending the polymer component and the conductive particle component, and optional adjuvants and then molding, e.g., injection or blow molding, or extruding the uncross-linked polymer, and then cross-linking the polymer to form a molded current limiting PTC polymer device. Note that the conductive polymer compositions of the invention may also be cross-linked subsequent to the attachment of the electrodes.

Materials suitable for use with the invention as metal electrodes include tantalum, tungsten, titanium, chromium, molybdenum, vanadium, zirconium, aluminum, silver, copper, nickel, gold, brass, zinc and mixtures or platings thereof.

The electrodes may be attached to the conductive polymer compositions of the invention by any one of four processes. First, the metal electrodes may be attached to the conductive particle rich and/or metallized surfaces of the conductive polymer composition using an electrically conductive adhesive. For a discussion regarding the use of electrically conductive adhesives in conductive polymer electrical devices, see, for example, U.S. Pat. No. 4,314,231 (Walty); the disclosure of which is incorporated herein by reference. Second, the electrodes may be soldered to the metallized surfaces of the conductive polymer composition. Third, the electrodes may be welded to the metallized surfaces of the conductive polymer composition. Fourth, the electrodes may be mechanically attached by spring pressure.

The current limiting PTC polymer device is typically connected in series with a power source and load. The source voltage can be rated as high as 600 $V_{rms}$. Preferred devices of the invention are reliable at rated voltages of 120 $V_{rms}$ to 600 $V_{rms}$ and have a survival life of at least three high fault short circuits (i.e., 480 V/100 kA) when used as a series fault current protection device in devices such as molded case circuit breakers, miniature circuit breakers and contactors.

The current limiting PTC polymer devices of the invention can be used for protecting motors, solenoids, telephone lines and batteries. These devices also can be used like fuses or circuit breakers but have the advantage of not requiring replacement or manual reset after a fault condition, since they are automatically resettable. The invention will now be illustrated by the following Example, which is intended to be purely exemplary and not limiting.

EXAMPLE 1

Figure 2:
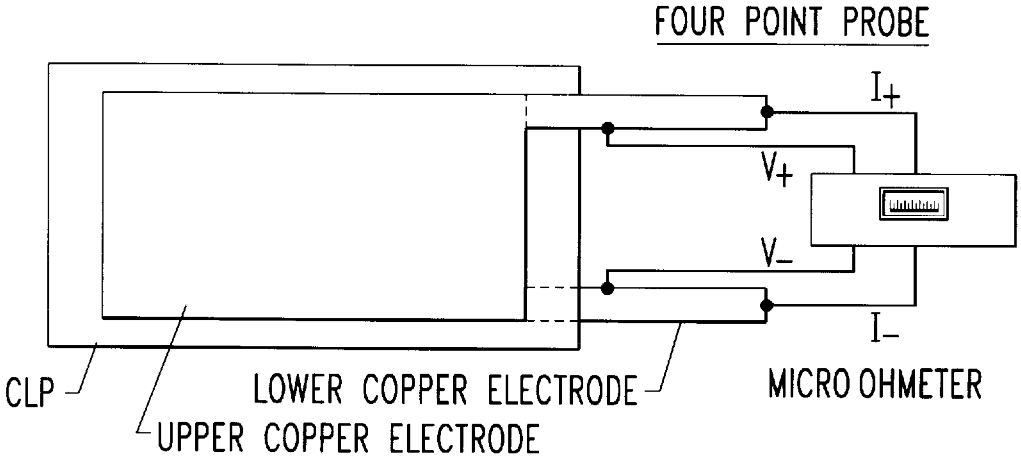
FIG. 2 is a depiction of a top view of the parallel plate electrode attachment and four point probe shown in FIG. 1.

Using the arrangement depicted in FIGS. 1 and 2, the device resistance for a current limiting PTC polymer device comprising a conductive polymer composition modified by the method of the invention is compared with that of a current limiting PTC polymer device comprising an unmodified conductive polymer composition. FIGS. 1 and 2 shows the methods used to obtain the pressure and resistance measurements. A force transducer was used to measure the force applied to the copper electrodes. The apparent pressure was then calculated by dividing the electrode surface area into the measured force. The device resistance was measured using a four point probe micro ohmmeter. The comparative results presented in graphical form in FIG. 3, were obtained using the same conductive polymer composition. That sample comprised a high density polyethylene/carbon black conductive polymer composition with copper electrodes.

Figure 3:
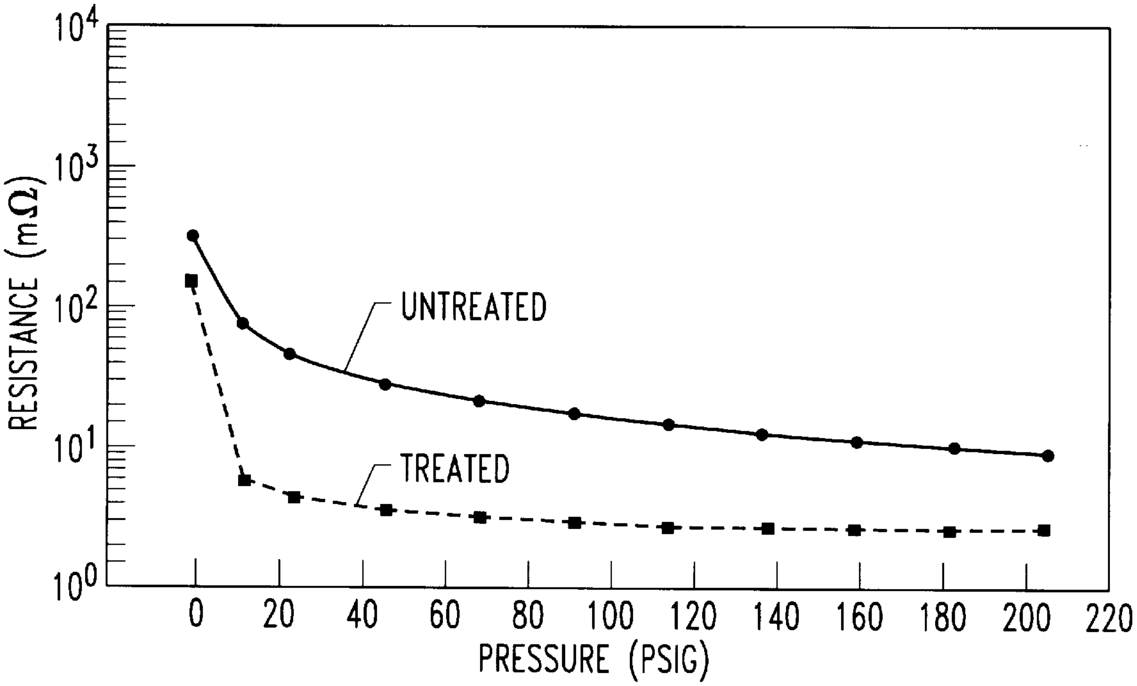
FIG. 3 is a graphical comparison of the device resistance for a surface modified conductive polymer composition containing device with that of an unsurface modified conductive polymer composition containing device.
Figure 4:
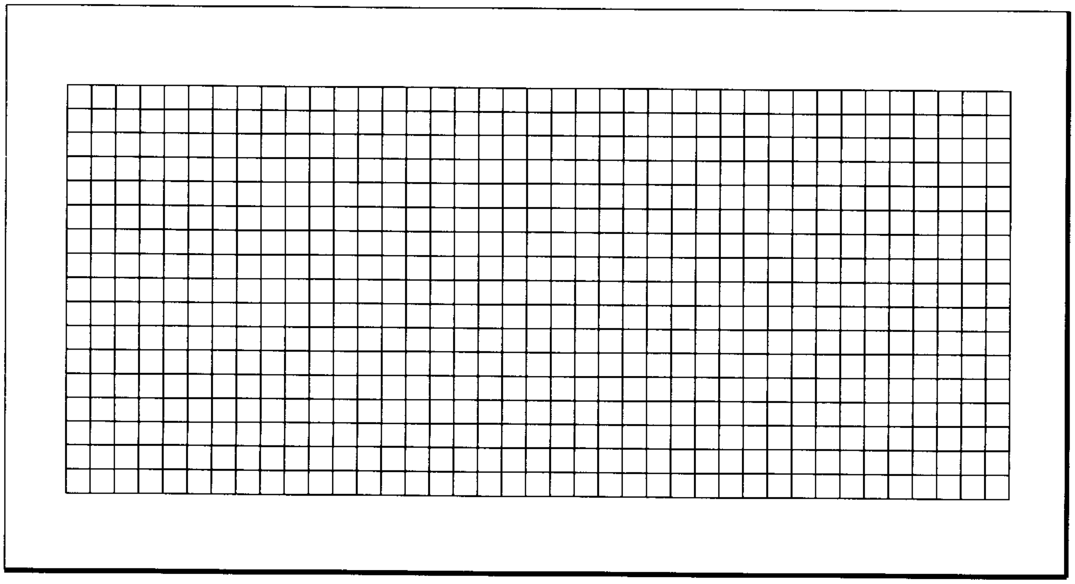
FIG. 4 is a depiction of the surface pattern developed in the surface of the conductive polymer composition by scribing.

The surface of the unmodified conductive polymer composition was mechanically scribed with a cross-hatch pattern to increase the surface area and to improve the adhesion of the sputtered electrodes. FIG. 4 shows the surface pattern developed in the surface of the conductive polymer composition by scribing. The surface was then scraped to remove loose debris, and was gently wiped with ethyl alcohol and lint free wipes. The scribed area was then framed with kapton tape to make a clean edge. The unmodified element was then sandwiched between two copper electrodes and the device resistance was measured at increasing pressures. The results are shown in FIG. 3.

Figure 5:
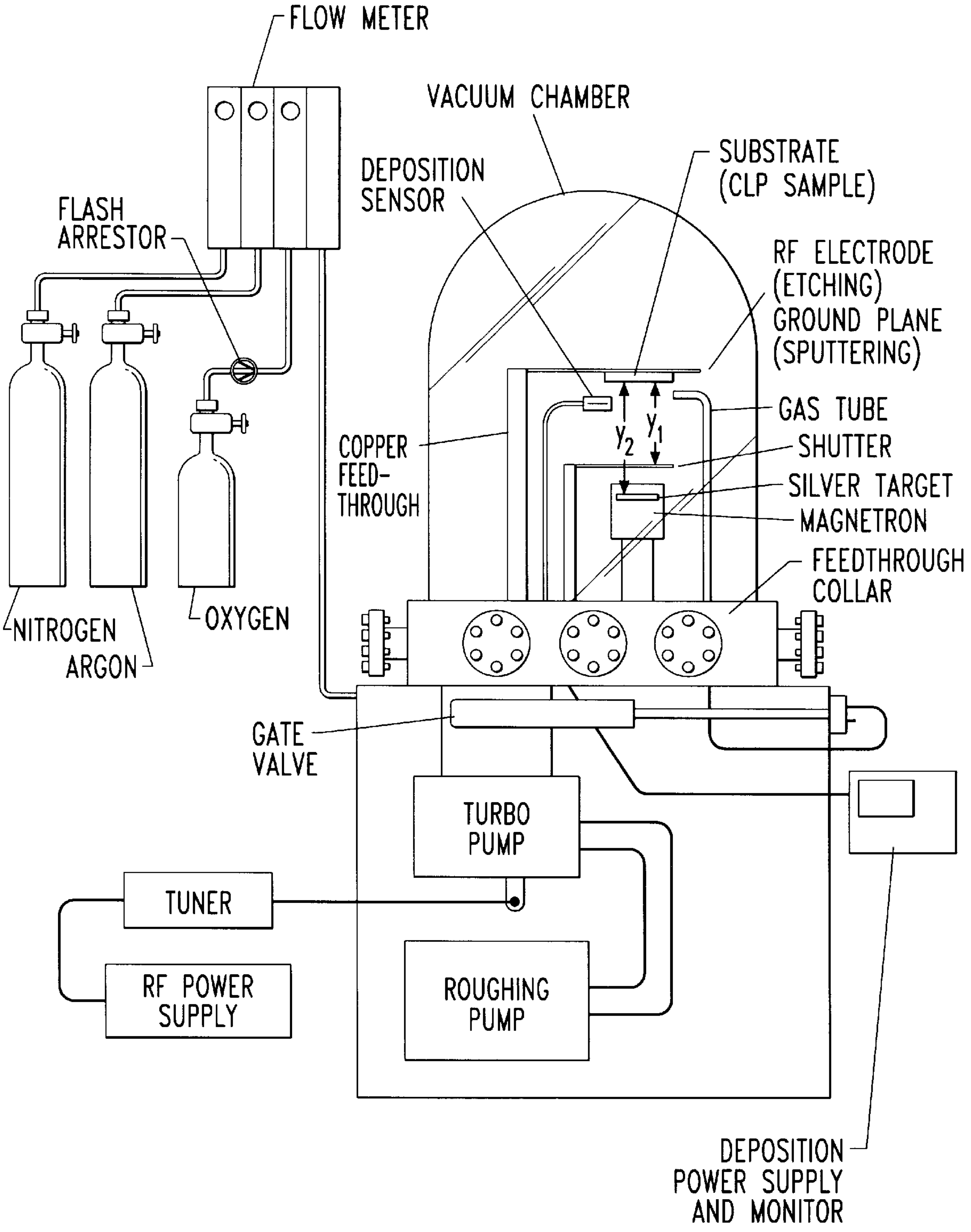
FIG. 5 is a depiction of the apparatus used to plasma treat the surface of the conductive polymer compositions of the invention.

The surface of the modified conductive polymer composition was prepared in the same way as the unmodified conductive polymer composition. The modified conductive polymer composition, however, was subjected to further treatment, namely by plasma etching. The etching process was performed in a bell jar vacuum system like that depicted in FIG. 5, for plasma processing. Using an oxygen/nitrogen plasma, the surface of the conductive polymer composition was etched. The process conditions implemented for the etching process are shown in Table 1.

TABLE 1

| | |
|---|---|
| RF Power: | 60 W |
| Frequency: | 13.52 MHz |
| Pressure (Indicated): | 290 mTorr |
| Gas 1: | Oxygen (99.98%) |
| Gas 2: | Nitrogen (99.999%) |
| $O_2$ flow (Indicated): | 85 SCCM @ 30 PSIG |
| $N_2$ (Indicated): | 15 SCCM @ 30 PSIG |
| Electrode Gap $Y_1$: | 5 cm |
| Etch time: | 120 s |

Silver was then deposited onto the plasma etched surface through plasma sputtering using the same apparatus used for the etching process. The process conditions implemented for the plasma sputtering are shown in Table 2.

TABLE 2

| | |
|---|---|
| Target Material: | Silver (99.99% purity) |
| Tooling Factor: | 30% |
| Target to substrate $Y_2$: | 15 cm |
| Deposition Rate: | 1.23 Å/s |
| Pressure (Indicated): | 10 mTorr |
| Gas: | Argon (99.998%) |
| Argon flow (Indicated): | 50 SCCM @ 30 PSIG |
| RF Power: | 50 W |
| Frequency: | 13.52 MHz |
| Deposition Time: | 68 minutes |
| Coating Thickness: | 0.50 μm |

The surface modified conductive polymer composition was then sandwiched between two copper electrodes and the device resistance was obtained at increasing different pressures. The results are shown in FIG. 3. (Note that the various gas flows and pressures shown in Tables 1 and 2 were not corrected for the specific gases involved. The actual gas readings were reported with gages calibrated for air. Accordingly, the actual gas flows and pressures will be slightly different from those indicated.)

We claim:

1. A current limiting PTC polymer device comprising:

a conductive polymer composition comprising a polymer with conductive particles dispersed therein, wherein said conductive polymer composition has at least two conductive particle rich surfaces, at least two electrodes in electrical contact with said at least two conductive particle rich surfaces; and wherein said at least two conductive particle rich surfaces are formed by plasma etching the surface of the conductive polymer composition.

2. A current limiting PTC polymer device comprising:

a conductive polymer composition comprising a polymer with conductive particles dispersed therein, wherein said conductive polymer composition has at least two metallized surfaces;

at least two electrodes in electrical contact with said at least two metallized surfaces;

wherein said at least two electrodes are electrically connected to said at least two metallized surfaces by at least one of the electrically conductive adhesive, welding, soldering and mechanical means using spring pressure; and wherein said at least two metallized surfaces are metallized by plasma sputtering with conductive metal particles selected from the group comprising tantalum, tungsten, titanium, chromium molybdenum, vanadium, zirconium, aluminum, silver, nickel and mixtures thereof.

3. The device of claim 2, wherein said conductive metal particles sputter deposited on the surface of the conductive polymer composition consist of at least one of titanium and chromium.

4. The device of claim 2, wherein said conductive metal particles comprise a mixture of tungsten and titanium.

5. A method for making a current limiting PTC polymer device comprising:

(a) preparing a conductive polymer composition comprising a polymer with conductive particles dispersed therein;

(b) treating at least two surfaces of the conductive polymer composition by plasma etching; and, (c) attaching at least two eletrodes to the at least two plasma etched surfaces of the conductive polymer composition using at least one of an electrically conductive adhesive, soldering, welding and mechanical means using spring pressure.

6. The method of claim 5, wherein step (b) further comprises sputtering a metal onto the at least two plasma etched surfaces by plasma sputtering.

7. A method of making a current limiting PTC polymer device comprising:

(a) preparing a conductive polymer composition comprising a polymer with conductive particles dispersed therein;

(b) metallizing at least two surfaces of the conductive polymer composition by plasma sputtering; and, (d) attaching at least two electrodes to the at least two plasma etched surfaces of the conductive polymer composition using at least one of an electrically conductive adhesive, soldering, welding and mechanical means using spring pressure.

* * * * *